(12) United States Patent
Burg et al.

(10) Patent No.: US 11,340,162 B2
(45) Date of Patent: May 24, 2022

(54) METHOD AND APPARATUS FOR COMPARING OPTICAL PROPERTIES OF TWO LIQUIDS

(71) Applicant: Max-Planck-Gesellschaft zur Foerderung der Wissenschaften e.V., Munich (DE)

(72) Inventors: Thomas P. Burg, Goettingen (DE); Margherita Bassu, Goettingen (DE); Foelke Purr, Braunschweig (DE); Andreas Dietzel, Braunschweig (DE)

(73) Assignee: MAX-PLANCK-GESELLSCHAFT ZUR FOERDERUNG DER WISSENSCHAFTEN E.V., Munich (DE)

( * ) Notice: Subject to any disclaimer, the term of this patent is extended or adjusted under 35 U.S.C. 154(b) by 134 days.

(21) Appl. No.: 16/850,212

(22) Filed: Apr. 16, 2020

(65) Prior Publication Data

US 2020/0240913 A1     Jul. 30, 2020

Related U.S. Application Data

(63) Continuation of application No. PCT/EP2018/078443, filed on Oct. 17, 2018.

(30) Foreign Application Priority Data

Oct. 18, 2017 (EP) .................................. 17197007

(51) Int. Cl.
*G01N 21/41* (2006.01)
*G02B 5/18* (2006.01)

(52) U.S. Cl.
CPC ....... *G01N 21/4133* (2013.01); *G02B 5/1819* (2013.01); *G01N 2021/4153* (2013.01)

(58) Field of Classification Search
CPC .. G01N 21/4133; G01N 21/05; G01N 21/554; G01N 21/41; G01N 21/4788;
(Continued)

(56) References Cited

U.S. PATENT DOCUMENTS 7,619,739 B1* 11/2009 Sutherland ........... G01N 21/774
356/432
7,919,172 B2    4/2011 Schueller et al.

OTHER PUBLICATIONS

S. G. Patching, Biochimica et Biophysica Acta (BBA)—Biomembranes, 2014, 1838, 43-55.
(Continued)

*Primary Examiner* — Hoa Q Pham
(74) *Attorney, Agent, or Firm* — Thomas | Horstemeyer, LLP

(57) ABSTRACT

For comparing first optical properties of a first fluid with second optical properties of a second fluid a first transparent grating having a grating constant is made of the first liquid, and a second transparent grating also having the grating constant is made of the second liquid. The second transparent grating is arranged at a lateral offset of less than 45% of the grating constant with regard to the first transparent grating such that grating bars of the first and second transparent gratings are arranged side by side. Coherent light is directed onto the first and second transparent gratings such that light which passed through the grating bars of the first and second transparent gratings forms a diffraction pattern comprising intensity maxima. Two light intensities of two intensity maxima of a same order higher than zero are measured and compared to each other.

20 Claims, 10 Drawing Sheets

(58) Field of Classification Search
CPC .......... G01N 2021/4153; G02B 5/1819; G02B 5/18; B01L 3/5027
USPC .................................. 356/432–440, 445–448
See application file for complete search history.

(56) References Cited

OTHER PUBLICATIONS

Q. G. Shi, L. N. Ying, L. Wang, B. J. Peng and C. F. Ying, Applied Mechanics and Materials, 2014, 551, 347-352.
K. S. Rangappa, Proceedings of the Indian Academy of Science—336 Section B, 1948, 131-143.
T. M. Libish, J. Linesh, M. C. Bobby, P. Biswas, S. Bandyopadhyay, K. Dasgupta and P. Radhakrishnan, Optoelectronics and Advanced Materials, Rapid Communications, 2011, 5, 68-72.
S. Agarwal, Y. Prajapati and V. Mishra, Opto-Electronics Review, 2015, 23, 271-277.
J. Homola, Chemical Reviews, 2008, 108, 462-493.
F. B. Myers and L. P. Lee, Lab on a Chip, 2008, 8, 2015.
M. Svedendahl, R. Verre and M. Käll, Light: Science & Applications, 2014, 3, e220.
F. De-Jun, L. Guan-Xiu, L. Xi-Lu, J. Ming-Shun and S. Qing-Mei, Applied Optics, 2014, 53, 2007.
S. Filion-Côté, M. Tabrizian and A. G. Kirk, Sensors and Actuators B: Chemical, 2017, 245, 747-752.
G. G. Yaralioglu, A. Atalar, S. R. Manalis and C. F. Quate, Journal of Applied Physics, 1998, 83, 7405-7415.
C. A. Savran, T. P. Burg, J. Fritz and S. R. Manalis, Applied Physics Letters, 2003, 83, 1659-1661.
K. Hosokawa, K. Hanada and R. Maeda, Journal of Micromechanics and Microengineering, 2002, 12, 1-6.
T. Thundat, E. Finot, Z. Hu, R. H. Ritchie, G. Wu and A. Majumdar, Applied Physics Letters, 2000, 77, 4061-4063.
G. Ye and X. Wang, Biosensors and Bioelectronics, 2010, 26, 772-777.
L. Chang, Z. Ding, V. N. L. R. Patchigolla, B. Ziaie and C. A. Savran, IEEE Sensors Journal, 2012, 12, 2374-2379.
Y. G. Tsay, C. I. Lin, J. Lee, E. K. Gustafson, R. Appelqvist, P. Magginetti, R. Norton, N. Teng and D. Charlton, Clinical Chemistry, 1991, 37, 1502-1505.
C.-L. Chang, G. Acharya and C. A. Savran, Applied Physics Letters, 2007, 90, 233901.
C. Lv, Z. Jia, Y. Liu, J. Mo, P. Li and X. Lv, Journal of Applied Physics, 2016, 119, 094502.
P. M. St. John, R. Davis, N. Cady, J. Czajka, C. A. Batt and H. G. Craighead, Analytical Chemistry, 1998, 70, 1108-1111.
M. M. Varma, D. D. Nolte, H. D. Inerowicz and F. E. Regnier, Opt. ett., 2004, 29, 950-952.
J. B. Goh, R. W. Loo and M. C. Goh, Sensors and Actuators B: Chemical, 2005, 106, 243-248.
BV Metrohm Autolab, Autolab Esprit Data Acquisition 4.4 User manual SPR, 2009.
Handbook of Spectroscopy, ed. G. ~Ganglitz and D. S. Moore, Wiley-VCH Verlag GmbH, 2014, p. 1993.
A. Ymeti, J. S. Kanger, R. Wijn, P. V. Lambeck and J. Greve, Sensors and Actuators B: Chemical, 2002, 83, 1-7.
K. Chaitavon, S. Sumriddetchkajorn and J. Nukeaw, RSC Advances, 2013, 3, 6981.
K. Chaitavon, S. Sumriddetchkajorn and J. Nukeaw, RSC Advances, 2013, 3, 23470.
A. Ymeti, J. Kanger, J. Greve, P. Lambeck, R. Wijn and R. Heideman, Transducers '03. 12th International Conference on Solid-State Sensors, Actuators and Microsystems. Digest of Technical Papers (Cat. No. 03TH8664), 2003,pp. 1192-1196.
Z. Wang and D. J. Bornhop, Analytical Chemistry, 2005, 77, 7872-7877.
V. Zamora, P. Lützow, M. Weiland and D. Pergande, Sensors, 2013, 13, 14601-14610.
H. Li and X. Fan, Applied Physics Letters, 2010, 97, 011105.
C. F. Carlborg, K. B. Gylfason, A. Ka'zmierczak, F. Dortu, M. J. Bañuls Polo, A. Maquieira Catala, G. M. Kresbach, H. Sohlström, T. Moh, L. Vivien, J. Popplewell, G. Ronan, C. A. Barrios, G. Stemme and W. van der Wijngaart, Lab Chip, 2010, 10, 281-290.
M. Li, X. Wu, L. Liu, X. Fan and L. Xu, Analytical Chemistry, 2013, 85, 9328-9332.
X. P. Zhang, G. Yan, S. Gao, S. He, B. Kim, J. Im and Y. Chung, Applied Physics Letters, 2011, 98, 221109.
W. Liang, Y. Huang, Y. Xu, R. K. Lee and A. Yariv, Applied Physics Letters, 2005, 86, 151122.
R. St-Gelais, J. Masson and Y.-A. Peter, Applied Physics Letters, 2009, 94, 243905.
T. Wei, Y. Han, Y. Li, H.-I. Tsai and H. Xiao, Optics Express, 2008, 16, 5764.
H. Wu, H. Huang, M. Bai, P. Liu, M. Chao, J. Hu, J. Hao and T. Cao, Optics Express, 2014, 22, 31977.
J. Tian, Y. Lu, Q. Zhang and M. Han, Optics Express, 2013, 21, 6633.
P. Domachuk, I. C. M. Littler, M. Cronin-Golomb and B. J. Eggleton, Applied Physics Letters, 2006, 88, 093513.
S. Surdo, S. Merlo, F. Carpignano, L. M. Strambini, C. Trono, A. Giannetti, F. Baldini and G. Barillaro, Lab on a Chip, 2012, 12, 4403.
S. Surdo, F. Carpignano, L. M. Strambini, S. Merlo and G. Barillaro, RSC Advances, 2014, 4, 51935-51941.
S. Mandal and D. Erickson, Optics Express, 2008, 16, 1623.
Z. Xu, X. Wang, K. Han, S. Li and G. L. Liu, Journal of the Optical Society of America A, 2013, 30, 2466.
Z. Xu, K. Han, I. Khan, X. Wang and G. L. Liu, Optics Letters, 2014, 39, 6082.
N. Kumawat, P. Pal and M. Varma, Scientific Reports, 2015, 5, 16687.
A. Marin, M. Joanicot and P. Tabeling, Sensors and Actuators B: Chemical, 2010, 148, 330-336.
S. Y. Yoon and S. Yang, Lab on a Chip, 2011, 11, 851.
K. Q. Kieu and M. Mansuripur, IEEE Photonics Technology Letters, 2006, 18, 2239-2241.
F. Pedrotti, L. Pedrotti, W. Bausch and H. Schmidt, Optik für Ingenieure, Springer Verlag, Berlin, 3rd edn, 2005.
K. Takamura, H. Fischer and N. R. Morrow, Journal of Petroleum Science and Engineering, 2012, 98-99, 50-60.
A. N. Bashkatov and E. A. Genina, Proc. SPIE 5068, Saratov Fall Meeting 2002: Optical Technologies in Biophysics and Medicine IV, 393 (Oct. 14, 2003), 2003, pp. 393-395.
A. Ebner, Handbook of Single-Molecule Biophysics, Springer Verlag, 2009, p. 410.
Ji Hung et al: "On Plasmonic energy transformation View project", Jan. 1, 2008, XP055536488.
Z. G. Li et al.: "On-chip phase shift refractometer via microfluidic liquid grating", Transducers 2009 : 2009 International solid-state sensors, actuators and microsystems conference; Denver, Colorado, USA, Jun. 21-25, 2009, Jun. 1, 2009, pp. 390-392.

* cited by examiner

METHOD AND APPARATUS FOR COMPARING OPTICAL PROPERTIES OF TWO LIQUIDS

CROSS REFERENCE TO RELATED APPLICATIONS

This application is a continuation to International Application PCT/EP2018/078443 with an international filing date of Oct. 17, 2018 entitled "Method and apparatus for comparing optical properties of two liquids" and claiming priority to European Patent Application No. EP 17 197 007.2 entitled "Method and apparatus for comparing optical properties of two liquids" and filed on Oct. 18, 2017.

FIELD OF THE INVENTION

The present invention relates to a method of and apparatus for comparing first optical properties of a first fluid with second optical properties of a second fluid. The first and second optical properties may particularly include a first and a second refractive index of the first and second fluids, respectively.

BACKGROUND OF THE INVENTION

The refractive index is a fundamental quantity, intrinsic to the physical and chemical properties of a substance. Measurements of refractive indices are widely used in the pharmaceutical industry,[1] environmental monitoring,[2] adulteration detection,[3-5] and biosensing.[6-10] Several technologies for refractive index measurement have been previously described in the literature, and with the push for further miniaturization, many microfluidic technologies have emerged. A brief summary of these methods is outlined in Table 1.

For many applications, there is a need to measure small changes in refractive index that are easily overwhelmed by nonspecific background signals. For example, measurements of concentration via refractive index require accurate temperature control, and refractive index based biosensors need to be made insensitive to non-specific binding or bulk refractive index changes. Differential measurements with two devices offer a partial remedy. However, the attainable background suppression is often limited due to alignment errors, fabrication tolerances, and other differences between independent sensors.

Diffractive optical microdevices open up a path to differential sensing with direct background cancellation by the interference of light waves. One key advantage of these devices is that the signal of interest and the reference are closely integrated and lie on the same beam path. This principle has previously been used for displacement sensing in micromechanics,[11-13] for chemical sensing,[14-18] and for biosensing[17-19]. In chemical and biological sensing, many powerful device concepts have been proposed based on micropatterning capture molecules or hydrogels into stimulus-responsive phase gratings.[17,20] Binding of target molecules or swelling of the hydrogel alters the wavefront of a laser passing through the element, and this can be read out via a consequent change of the diffraction pattern in the far-field. Multiplexing is also possible by this principle if multiple gratings with different orientation are overlaid.[21,22]

TABLE 1

Microfluidic refractive index measurement methods

| Technology | Detection limit | Background cancelation/self-referencing | Size/Volume | Ref. |
| --- | --- | --- | --- | --- |
| Surface Plasmon Resonance | $1*10^{-7}$-$2*10^{-5}$ RIU | no | 20-150 $\mu L^{23}$ | 24 23 |
| Young interferometer | $1.8*10^{-8}$ RIU$^{25}$ | yes, reference arm | 6 $\mu L^{25}$ | 25, 26, 27, 28 |
| Microinterferometric backscatter detector | $6.9*10^{-9}$ RIU | yes, two capillaries: fringe subtraction | 50 nL | 29 |
| Ring resonator | $3.16*10^{-6}$ RIU$^{30}$ $3.8*10^{-8}$ RIU$^{33}$ $5.0*10^{-6}$ RIU$^{32}$ | Independent reference structures: multiple sensors on one chip with beam splitter$^{32}$ Yes, double resonator$^{33}$ | 200 × 20 $\mu m$/ 10 $\mu L/min^{32}$ Resonator cross section: 68 $\mu m^{31}$ | 30, 31, 32, 33 |
| Fiber Bragg Grating | $2.2*10^{-5}$ RIU | no | 3.45 $\mu m$ per hole | 34, 35 |
| Fabry-Perot Cavity | $1.7*10^{-5}$ RIU$^{36}$ | no | Cavity width = 24.5 $\mu m^{36}$ | 36, 37, 38, 39, 40, 41, 42 |
| Photonic crystal: Nanoscaled Optofluidic Sensor Array (NOSA) | $7*10^{-5}$ RIU | Independent reference structures: Multiple sensor structures on one chip with one waveguide | Hole diameter 200 nm, 250 nm deep, 8 holes per sensor | 43 |
| Diffraction grating | $1.9*10^{-6}$ RIU$^{44\ 45}$ $6*10^{-7}$ RIU$^{46}$ | I0 as reference | 50 $\mu m$ thick fluid layer$^{46}$ | 44, 45, 46 |
| Micro edge | $3*10^{-3}$ RIU | no | 20 $\mu m$ deep; 250 $\mu m$ wide | 47 |
| $\mu$-image defocusing 3-pinhole aperture | 53.7 pixel/RIU | self-calibration: reference fluids included on chip - one image measurement | 50 $\mu m$ wide; 17-82 $\mu m$ deep | 48 |
| Tapered fiber | $1.42*10^{-5}$ RIU$^{49}$ | no | Diameter of fiber 200 $\mu m$; 6 mm long$^9$ | 9, 49 |

There still is the need of a method of and an apparatus for comparing first optical properties of a first fluid with second optical properties of a second fluid, which allow for a straightforward implementation and nevertheless allow for a precise measurement of, for example, a difference of refractive indices of the first and second fluids both with regard to sign and magnitude.

SUMMARY OF THE INVENTION

The present invention relates to a method of comparing first optical properties of a first fluid with second optical properties of a second fluid. In the method, a first transparent grating having a grating constant is made of the first fluid. A second transparent grating also having said grating constant is made of the second fluid. The second transparent grating is arranged at a lateral offset of less than 45% of said grating constant with regard to the first transparent grating such that each pair of grating bars of the first and second transparent gratings arranged side by side form an asymmetric unit cell of an overall arrangement of the first and second transparent gratings. Coherent light is directed onto the first and second transparent gratings such that light which passed through the grating bars of the overall arrangement of the first and second transparent gratings forms a diffraction pattern comprising intensity maxima. Two light intensities of two intensity maxima of the diffraction pattern which are of a same order higher than zero are measured and compared to each other.

Further, the present invention relates to an apparatus for comparing first optical properties of a first fluid with second optical properties of a second fluid. The apparatus comprises a microfluidic chip in which first and second sets of parallel fluidic channels are provided under a transparent cover plate. The fluidic channels of the first set are arranged at a fixed spacing and connected to a first fluid supply channel at one of their ends and to a fluid removal channel at the other one of their ends. The fluidic channels of the second set are arranged at said fixed spacing and connected to a second fluid supply channel at one of their ends and to a fluid removal channel at the other one of their ends. The fluidic channels of the second set are arranged at a lateral offset of less than 45% of said fixed spacing with regard to the fluidic channels of the first set such that each pair of the fluidic channels of the first and second sets arranged side by side form an asymmetric unit cell of an overall arrangement of the first and second sets.

The present invention also relates to a method of use of such an apparatus. In the method of use, a temporal development of material deposited on or removed from the inner surfaces of one or both sets of nanochannels is monitored by repeatedly directing the coherent light onto the first and second transparent gratings that are formed by the nanochannels and measuring the two light intensities of the two intensity maxima of the same order.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
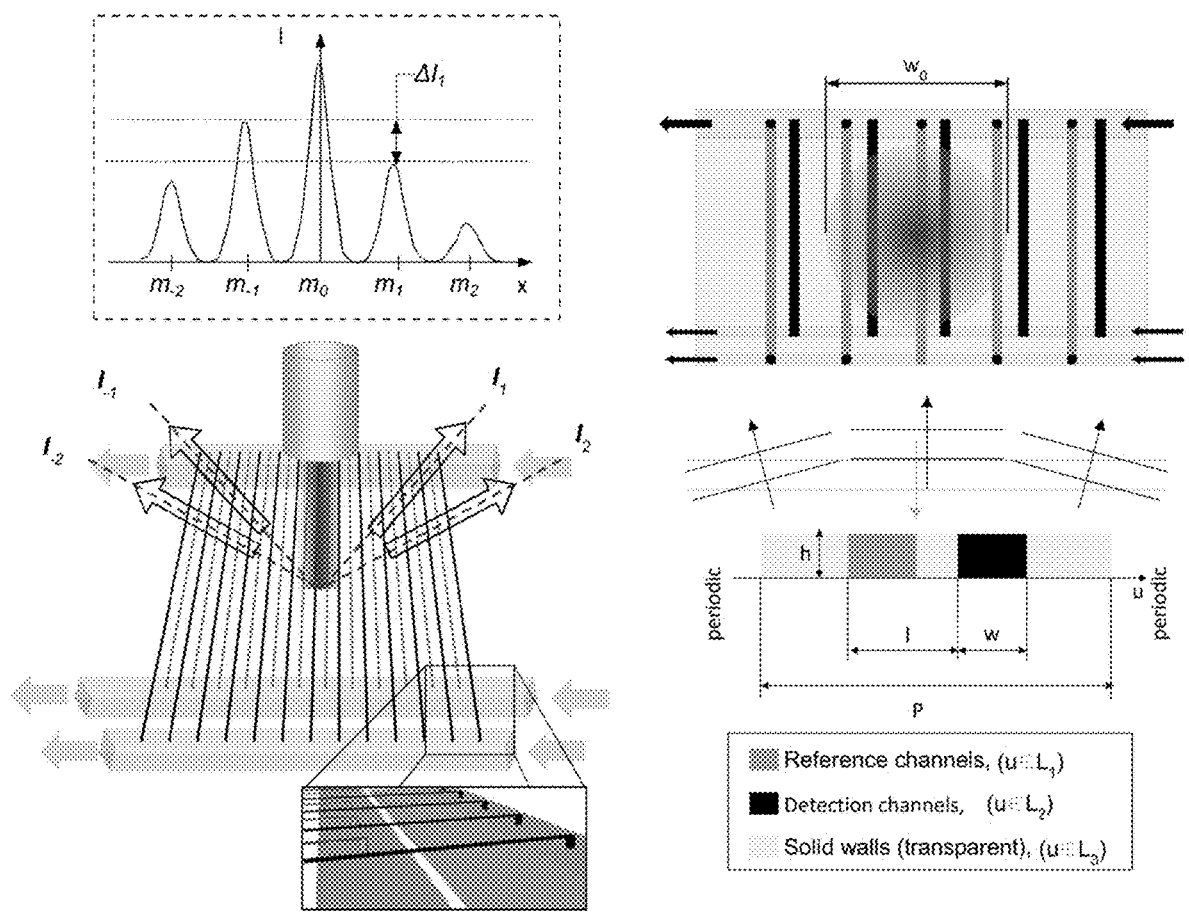
FIG. 1 is a schematic showing the diffraction grating with nanochannels with an asymmetric arrangement of detection and reference channels and the intensity profile of the reflected diffraction pattern. The reference channels, the detection channels and the solid walls of the transparent plate are depicted in yellow, green and gray, respectively. The channels may be open or closed. Without loss of generality, they are depicted open here, but they may also be closed with a lid made of a transparent material.

In this description and the accompanying claims, the term fluid may refer to a gas or an aerosol. More particular, it refers to a liquid or a liquid based suspension.

The first and second optical properties may particularly include or be determined by a first and a second refractive index of the first and second fluids, respectively. In another embodiment, the first and second optical properties may be determined by absorbance and/or reflectivity and/or turbidity.

That the second transparent grating is arranged at a lateral offset of less than 45% of the grating constant with regard to the first transparent grating means that the overall arrangement of the first and second gratings is not symmetric with regard to any of the grating bars. As a result, the grating constant of both the first and second gratings also is the grating constant of their overall arrangement, and each pair of grating bars of the first and second transparent gratings arranged side by side only form a unit cell of the overall arrangement. Due to the asymmetry of this unit cell, the effect of a difference in optical properties between the first and second fluids on the maxima of the diffraction pattern is also asymmetric. Thus, whether the light intensities of the maxima on the left or right hand side of the diffraction pattern increase over the light intensities of the maxima on the other side depends on the sign of the variation of the optical properties. Thus, with the optical properties being determined by the refractive indices of the first and second fluids, the sign of the difference of the refractive indices of the first and second fluids will be decisive. Further, the magnitude of the increase is directly correlated with the magnitude of the variation of the optical properties, i.e., for example, with the difference of the refractive indices of the first and second fluids.

Particularly, the refractive index difference between the first refractive index of the first fluid and the second refractive index of the second fluid can be calculated from a difference of the two light intensities of two intensity maxima of the same order divided by a sum of the two light intensities of two intensity maxima of the same order and by a constant. This constant will be fixed for the respective embodiment of the present invention.

In one embodiment, the first and the second fluids are transparent or clear liquids or gases. In this case the refractive indices of the first and second fluids will determine their optical properties. In another embodiment, the first and the second fluids are two biological fluids containing cells. In this case, the reflectivity and/or absorbance and/or turbidity and/or refractive index of the cell suspension will determine the optical properties of the first and second fluids.

The cells in the biological fluid may be dead or living. With living cells, a temporal development of the cells in the two biological fluids can be monitored by repeatedly directing the coherent light onto the first and second transparent gratings and measuring the two light intensities of the two intensity maxima of the same order.

With regard to the apparatus for comparing first optical properties of a first fluid with second optical properties of a second fluid, all of the parallel fluidic channels in the microfluidic chip will be arranged in one common plane.

If the term spacing is used to define the first set of channels or the second set of channels, this term does not refer to the free lateral distances of the respective set of channels but to a repetition or period length including the width of the channels.

That the microfluidic chip has a reflective front face or that the microfluidic chip being transparent has a reflective back face reflecting the coherent light may be achieved in various ways which include, for example, a reflective coating or interface and a polished surface hit by the coherent light at an angle beyond the critical angle for total reflection.

Often, the fluidic channels in the microfluidic chip will be true nanochannels, i.e. of a depth in the direction perpendicular to their common plane of less than 1 μm. Nevertheless, if the term nanochannel is used in the following, this is only intended to indicate fluidic channels of a small depth of not more than 10 μm but not intended to limit these channels to true nanochannels.

Now referring in greater detail to the drawings, measuring small changes in refractive index can provide both sensitive and contactless information on molecule concentration or process conditions for a wide range of applications. However, refractive index measurements are easily perturbed by non-specific background signals, such as temperature changes or non-specific binding. Here, we present an optofluidic device for measuring refractive index with direct background subtraction within a single measurement. The device is comprised of two interdigitated arrays of nanofluidic channels designed to form an optical grating. Optical path differences between the two sets of channels can be measured directly via an intensity ratio within the diffraction pattern that forms when the grating is illuminated by a collimated laser beam. Our results show that no calibration or biasing is required if the unit cell of the grating is designed with an appropriate built-in asymmetry. In proof-of-concept experiments we attained a noise level equivalent to ~$10^{-5}$ refractive index units (30 Hz sampling rate, 4 min measurement interval). Furthermore, we show that the accumulation of biomolecules on the surface of the nanochannels can be measured in real-time. Because of its simplicity and robustness, we expect that this inherently differential measurement concept will find many applications in ultra-low volume analytical systems, biosensors, and portable devices.

More particular, we describe a new diffractive optofluidic device for measuring small differences in refractive index between two fluids that are guided through nanofluidic channels. The device consists of two sets of nanochannels, which are arrayed to form an interdigitated grating with an asymmetric unit cell. We show for the first time that the asymmetry enables linear optical differencing in diffractive sensors even when the optical layer thicknesses (here the nanochannel depths) are fixed and cannot be adjusted to achieve phase quadrature. Using this device, it is possible to measure small differences in the bulk refractive index of two solutions in the presence of large common-mode fluctuations. Alternatively, the device can measure optical path differences caused by different surface-adsorbed layers. This effect is significant due to the small height of our nanofluidic channels. We envision that the inherently differential measurement and the efficient surface-directed transport of molecules in the nanofluidic channels render this concept interesting for label-free biosensing applications.

Optofluidic Grating Design and Theory

A schematic representation of the nanofluidic diffraction grating device where reference and detection nanochannels are placed in an asymmetric interdigitating arrangement is shown in FIG. 1. The asymmetric unit cell of the grating results in the formation of a diffraction pattern which is not mirror-symmetric ($I_{-m} \neq I_m$). Importantly, this asymmetric distribution is produced only when the refractive indices in the reference (yellow) and in the detection channels (green) are different, $\Delta n = n_{Ref} - n_{Det} \neq 0$. This allows changes in the refractive index within the detection nanochannels to be detected by measuring the difference in intensity $\Delta I_m = I_{-m} - I_m$.

For a correct signal processing, we calculated (see below: Supplement on Theory) the dependence of the intensity distribution of the diffraction pattern produced by the asymmetric grating for small $\Delta n$.

Fabrication

Figure 2A:
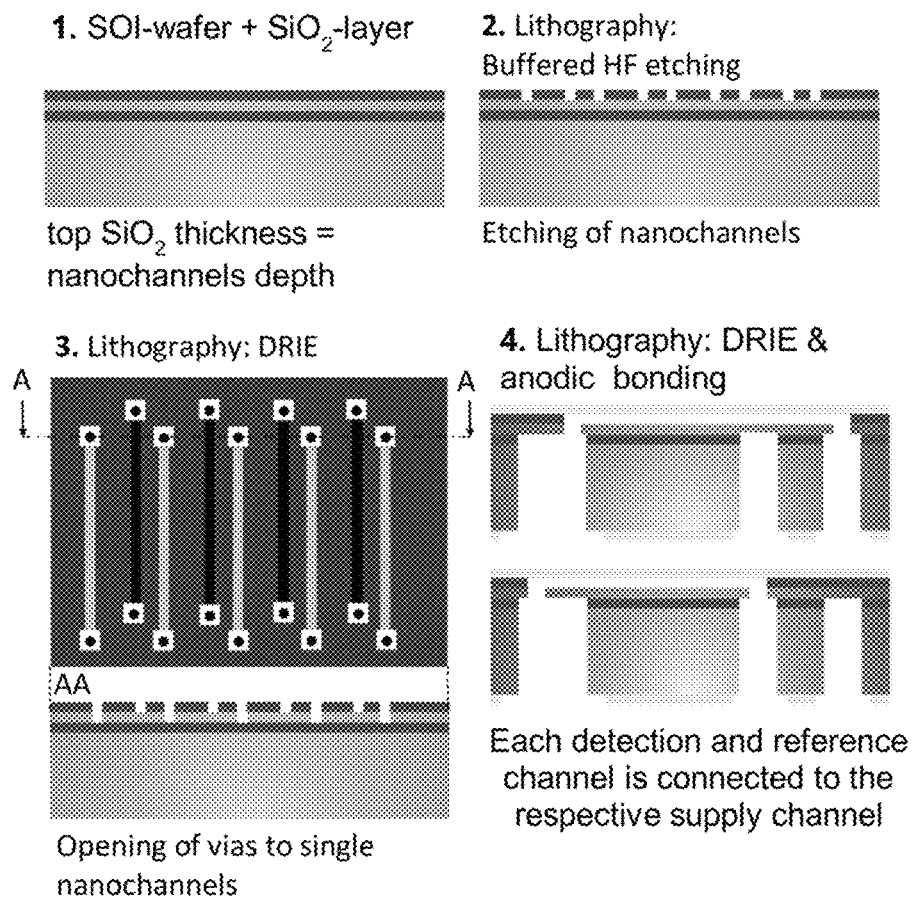
FIG. 2A is a schematic of the fabrication process for the nanofluidic asymmetric grating device.

The nanofluidic grating sensor was fabricated using standard microfabrication techniques as shown in FIG. 2A. Silicon-on-insulator (SOI) wafers were initially dry thermally oxidized to a depth of 290 nm. Nanochannels were then formed on the $SiO_2$ top layer using photolithography and buffered hydrofluoric acid (BHF) wet etching. The silicon device layer of the SOI wafer acted as an etch stop, resulting in a nanochannel depth (h) equal to the thickness of the $SiO_2$ layer.

Figure 2B:
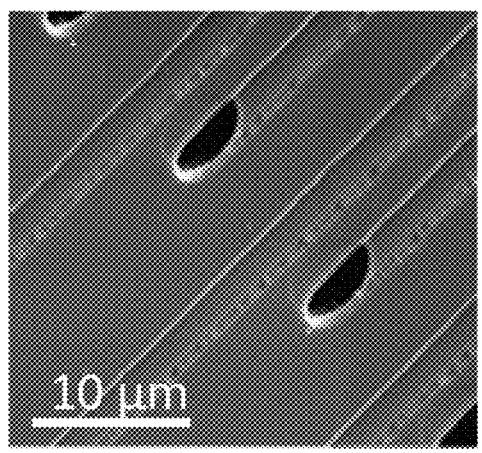
FIG. 2B is a SEM top tilted view of open nanochannels and supply vias.
Figure 2C:
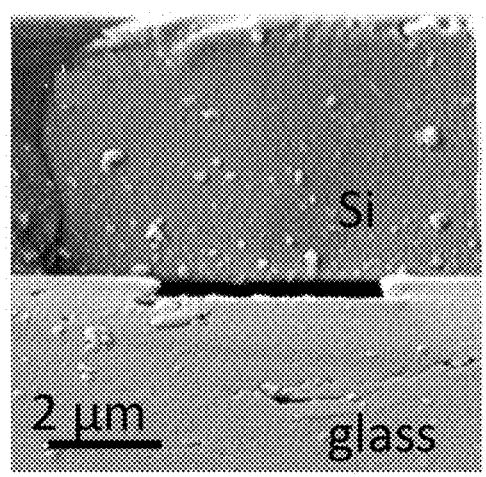
FIG. 2C is a SEM cross sectional view of a 290 nm deep nanochannel after glass wafer bonding to Silicon-on-Insulator (SOI) wafers.
Figure 2D:
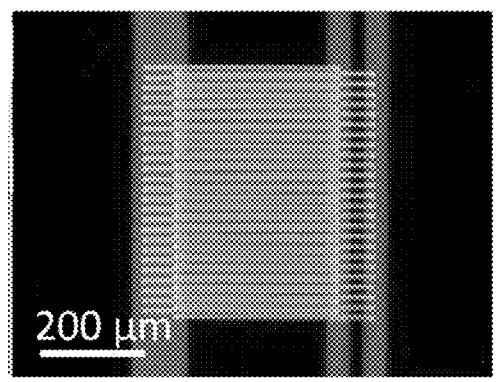
FIG. 2D is an optical top view image of the nanofluidic grating. The transmission of light through the 4 µm thick silicon device layer gives the red coloration to the back side feeding channels.

For the lateral dimensions of the nanochannels, we selected two combinations: (1) w=3 µm, l=7 µm, P=18 µm and (2) w=4 µm, l=6 µm, P=18 µm. These dimensions were chosen to obtain high sensitivity to bulk refractive index changes and to surface-adsorption while maintaining safe tolerances during fabrication. The grating layout consisted of 25 reference and detection nanochannels, respectively, for a total of 50 channels per grating, and each channel was 320 µm in length. Vias (3 µm in diameter) on each end of the nannochannels were opened by deep reactive ion etching (DRIE) through the silicon device layer of the SOI followed by BHF to open the buried oxide, see FIG. 2B.

Subsequently, a 210 µm thick Borofloat 33 wafer was bonded to the top side of the silicon wafer to seal the nanofluidic grating. The silicon wafer was then ground to a thickness of 50 µm and polished. After the silicon was thinned down, microfluidic channels were etched from the back side by DRIE to connect to the vias previously fabricated from the top side. After bonding, a thin residual oxide diaphragm that sometimes remained in the vias was cleared by a vapor-phase HF etch. Thinning the silicon served a dual role in the above process. First, the depth and aspect ratio of the DRIE step was significantly reduced; thus, the etching could be stopped uniformly and with minimal footing on the buried oxide layer of the SOI. Second, the volume of the microfluidic channels connecting to the nanochannels could be kept small in this way.

Finally, a 700 µm thick Borofloat 33 wafer was bonded onto the back side of the wafer to ensure the robustness of the fabricated devices. Before bonding, through-holes (800 µm in diameter) were opened on the back side Borofloat 33 wafer by femtosecond laser ablation to allow fluid delivery into the nanofluidic system.

Optical and Fluidic Setup

The diffraction pattern that is generated when a collimated laser beam ($\lambda$=635 nm, waist diameter 360 µm) impinges on the nanofluidic grating is reflected back onto a mirror and into a CCD camera (Thorlabs DCU223M or Andor iXon Ultra). The signal intensity of each maximum ($I_{\pm m}$) is measured by integrating the gray values over an area large enough to include all of the signal. A pressure-driven fluidic system was used to introduce fluids into all channels. The reference and detection nanochannels can be supplied with different fluids through separate microfluidic supply channels (FIG. 1 and FIG. 2B), enabling selective functionalization and avoiding contamination between the channels. The fluids are guided through the nanochannels by controlling the pressures on either side.

For each measurement, a baseline was determined by flushing all channels with the reference solution (water or PBS for these studies) for five minutes. At the five minute interval, the pressure difference was switched to introduce the sample solution into only the detection channel and reference solution was maintained in the reference channel. Following the measurement, all channels in the grating were again filled with the reference solution. To avoid clogging of the nanochannels, all solutions were passed through a 300 kDa cutoff filter before use.

Results and Discussions

Device Characterization

Figure 3A:
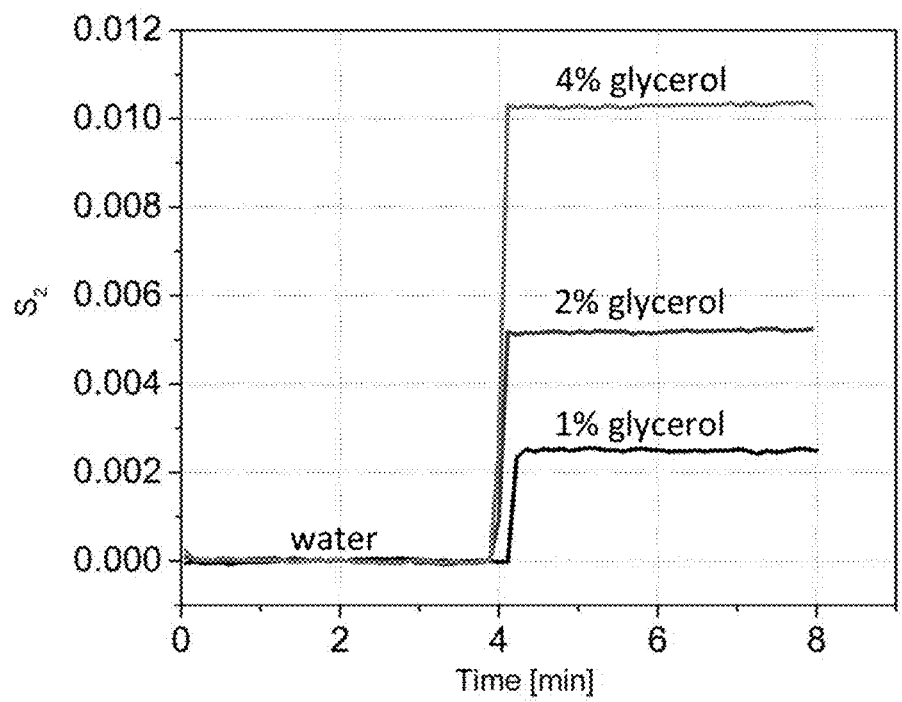
FIG. 3A is a plot of the signal S2 as a function of the measurement time. The definition of $S_m$ (where m is an integer) is stated in terms of the mode intensities in Equation 6. A sudden change in $S_2$ is observed when the glycerol solution is introduced into the detection nanochannels.

To validate our theoretical model, we conducted calibration measurements using glycerol solutions in DI water in the concentration range of 1-30% (w/w). The refractive index of glycerol depends strongly on the solution concentration.[51] All glycerol solutions were also characterized with a pocket refractometer (Atago USA, Inc.) prior to analysis with our new method. For each measurement, all channels were initially filled with DI water, and the resulting signal was taken as a baseline. When the glycerol solution was then introduced into the detection channels at around 4 minutes, the difference in refractive index between detection and reference channels resulted in a change in the signal $S_2$, see FIG. 3A. The same procedure was then repeated in triplicate for every concentration of glycerol, thus demonstrating the repeatability of the measurements and stability of the system. In all measurements the same baseline was recovered when water was again introduced into the detection channels.

Figure 3B:
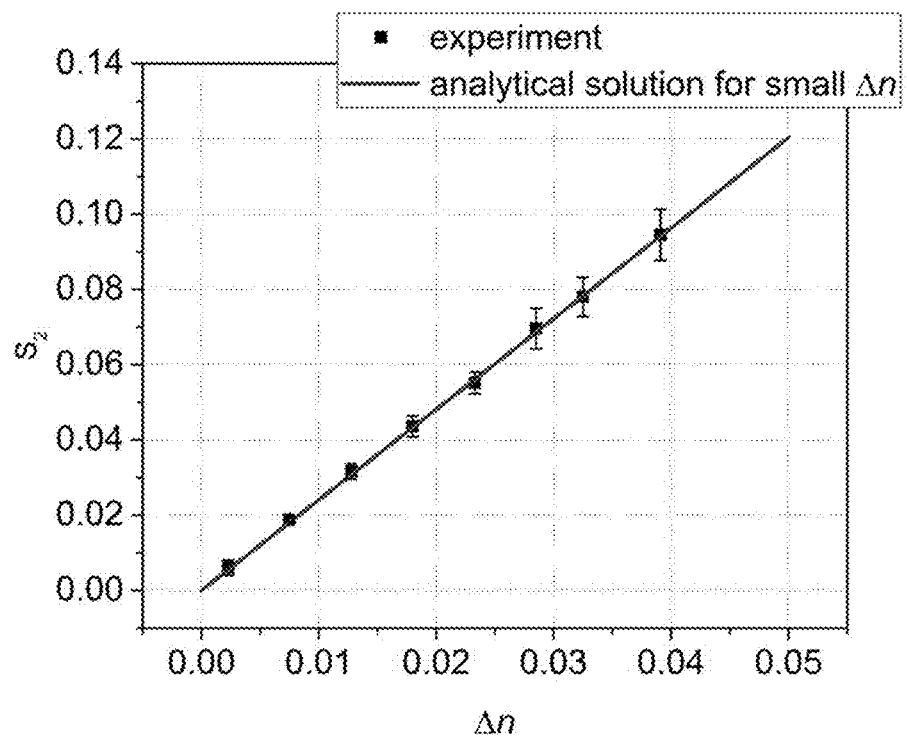
FIG. 3B is an experimental calibration curve and analytical solution for small Δn as a function of Δn. (Device dimensions w=3 µm, l=4 µm, P=18 µm).

Values of $S_2$ are plotted as a function of the independently measured $\Delta n$ in FIG. 3B. For comparison, FIG. 3B also shows the theoretical prediction calculated according to equation 7. The slope $s = \partial S_2 / \partial \Delta n$ corresponds to the sensitivity of our device. Based on the geometry and the wavelength we find $s=2.408$ $RIU^{-1}$. Importantly, the linear response of the sensor corresponds accurately with the analytical solution for the entire range of $\Delta n$ measured. Linear regression on the data shown in FIG. 3B yields a slope $\hat{s}=2.416\pm0.01926$ $RIU^{-1}$ (correlation coefficient of R=0.99954). This is in good agreement with the analytical prediction.

The noise floor is dominated by low-frequency fluctuations. Over the first four minutes of measurement, the refractive index equivalent of the standard deviation in S2 is $\sigma(\Delta n)=1.3\times10^{-5}$ RIU. For comparison with other methods that are summarized in Table 1, our limit of detection taken as three standard deviations above the noise corresponds to $\sim 4\times10^{-5}$ RIU.

Common Mode Rejection Analysis

Figure 4:
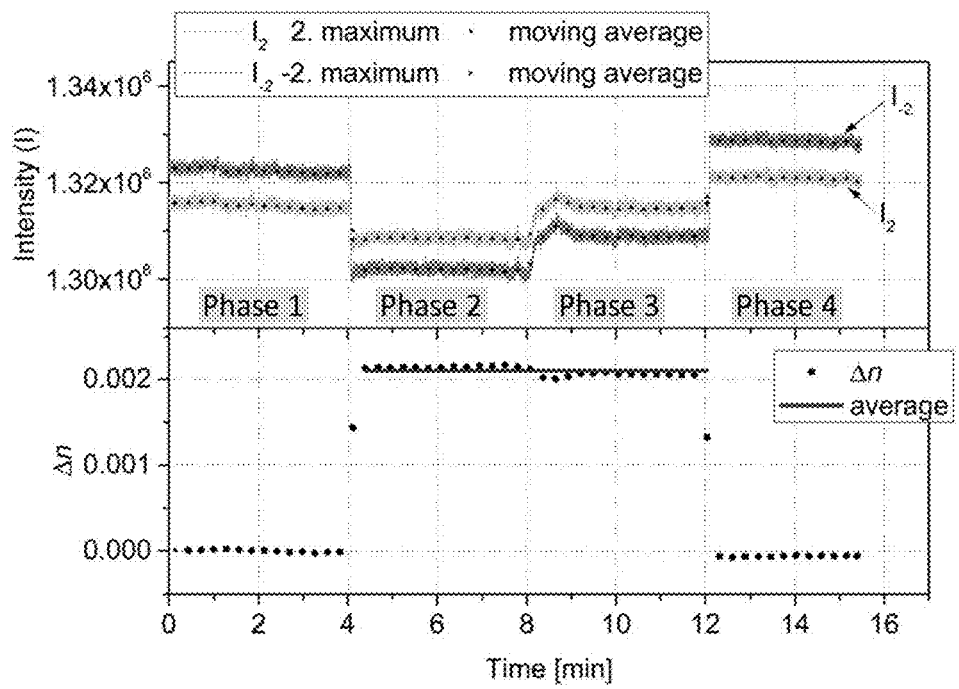
FIG. 4 illustrates an experimental verification of common mode rejection. Phase 1: DI water in reference and detection channel, T=25° C. Phase 2: 2% glycerol solution in reference channel, T=25° C. Phase 3: 2% glycerol solution in reference channel, T=33° C. Phase 4: DI water in reference and detection channel, T=33° C. (Device dimensions w=4 µm, l=6 µm, P=18 µm).

The accuracy of refractive index measurements can be significantly affected by temperature fluctuations. Here, we show that the differential design of our sensor greatly reduces the influence of thermal drift on the measurement result. FIG. 4 shows an experiment where common refractive index changes due to temperature changes are efficiently suppressed. The experiment is divided into four phases. In the first phase, the temperature of the device was set to 25° C. and DI water was introduced into both channel types. In the second phase, a 2% glycerol solution was introduced into only the detection nanochannels. This induced a decrease in both intensities $I_{-2}$ (black) and $I_{+2}$ (orange).

A $\Delta n=0.0025$ was calculated starting from the measured $S_2$ using the experimentally determined sensitivity of 2.416/$\Delta$RIU. In the third phase, the temperature of the device was increased by 8° C. inducing a change in the refractive index in both reference and detection channels. Although this can be noted as an increase in the individual mode intensities $I_{+2}$ and $I_{-2}$, the effect of the temperature change is significantly suppressed in the measured $\Delta n$. A small decrease of $\Delta n$ of about $2 \times 10^{-4}$ RIU was measured in the third phase, around an order of magnitude smaller than the change induced in the refractive index of water by the 8° C. increase of the temperature.[52] In the fourth phase, water was introduced again to the reference channel, and the measured $\Delta n$ subsequently decreased back to values close to zero, despite the temperature remaining 8° C. higher than the initial starting temperature. These results show that common-mode changes in refractive index are suppressed by at least one order of magnitude.

Protein Detection

Figure 5:
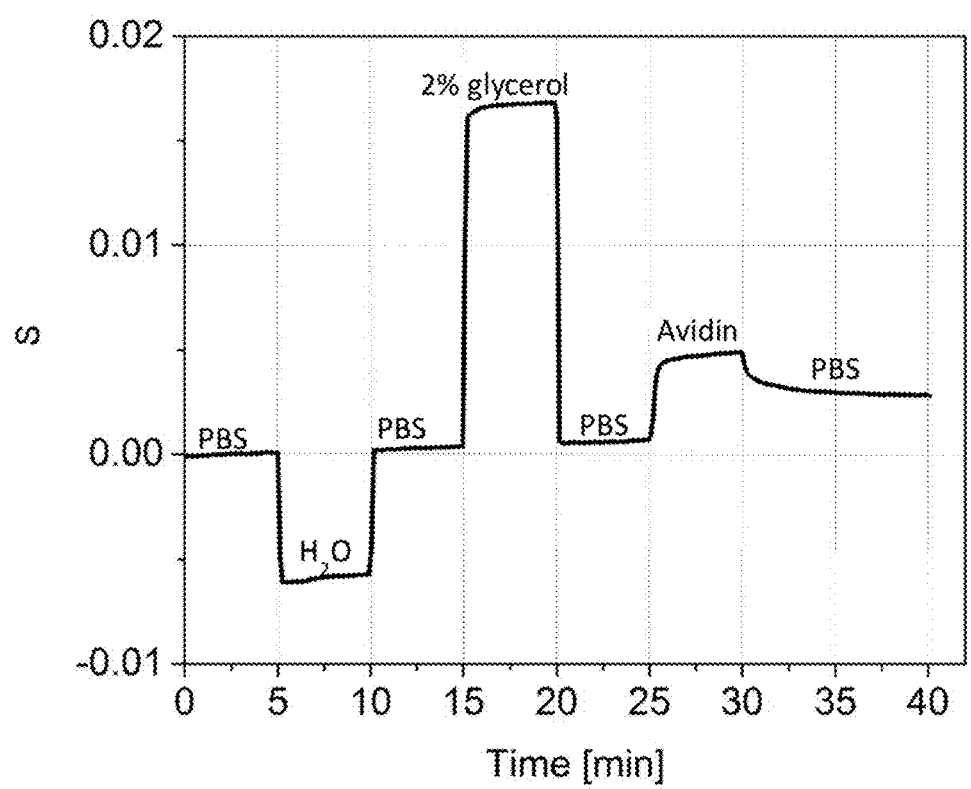
FIG. 5 shows signal changes ($S_1$) due to sequential sample measurement (water and 2% glycerol) in addition to measurement of protein accumulation of avidin in detection channels. (Device dimensions w=4 µm, l=6 µm, P=18 µm).
Figure 6:
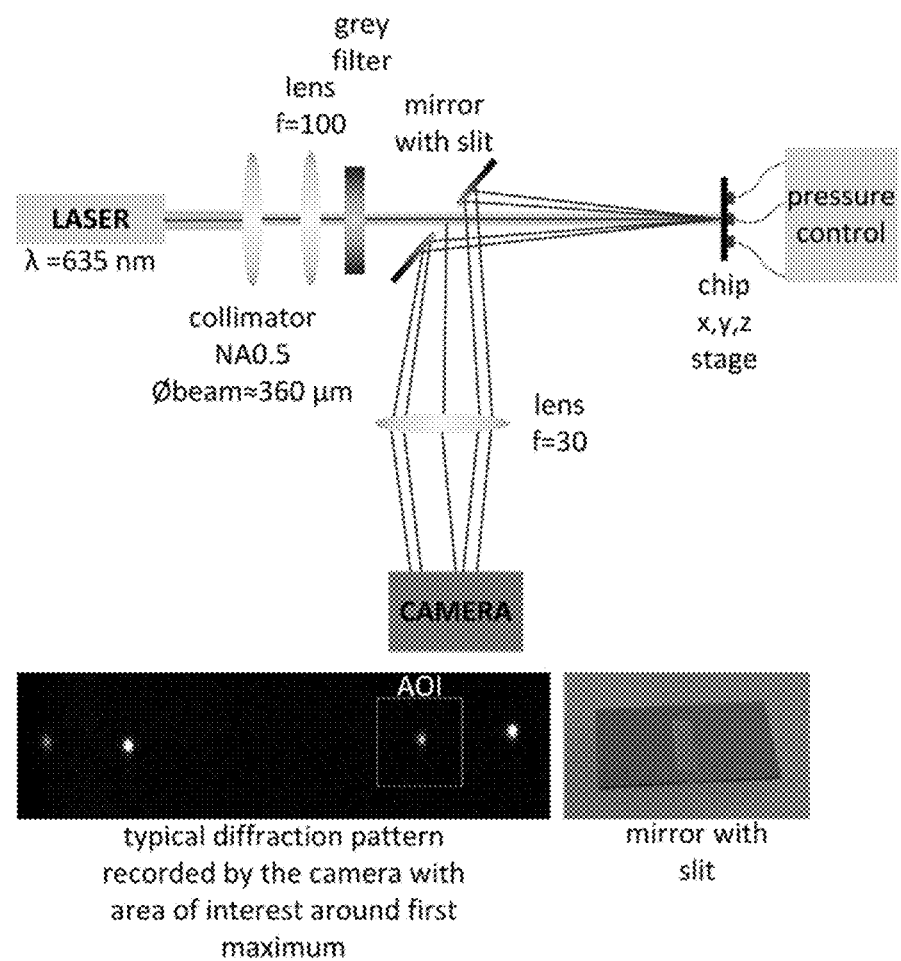
FIG. 6 shows an embodiment of a setup of measurement. The observed diffraction pattern is generated when a collimated laser beam (l=635 nm, waste diameter 360 µm) impinges on the nanofluidic grating and is then reflected back onto a mirror and into a digital camera (for example: Thorlabs DCU223M or Andor iXon Ultra or Andor Neo or PCO Edge 4.2 or other detector with at least two detection elements, or pixels.) that records the intensity. The mirror is made out of a glass wafer with a reflecting layer on top which is made of gold here. A slit (3 mm×10 mm) in the center of the mirror allows the incoming laser beam to pass, but the diffraction pattern is reflected towards the camera. Only the 0th maximum is not reflected as it also passes through the slit in the mirror. This is beneficial for the signal processing as the 0th maximum is very bright compared to the other maxima and might interfere with the other maxima without containing any information. The signal intensity of each maximum is measured by integrating the grey values over an area large enough to include the entire signal (AOI-area of interest).
Figure 7:
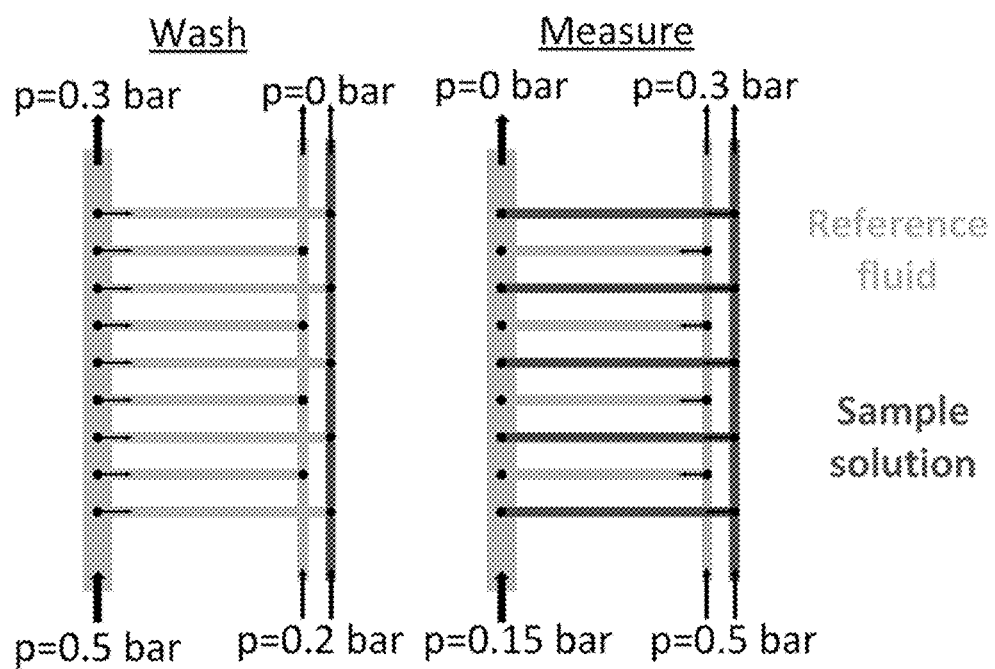
FIG. 7 shows how fluid flow in the nanofluidic grating is provided by pressure control. Fluid is pumped continuously through the microchannels by the selected pressure values. During the wash step, the same fluid is pushed from the main microchannel (left) into the nanochannels. During the measure step, different reference (pale green) and sample (blue) fluids are pushed from the respective microchannels into the nanochannels. The mentioned pressure values in FIG. 7 have been used for all measurements with water and glycerol solutions. In case of fluids with higher viscosities, like piranha solutions for cleaning, the pressure values were increased accordingly to ensure fluid flow.

To test whether the nanofluidic grating sensor can be used to detect changes in refractive index due to surface binding, we immobilized avidin to the channel walls (FIG. 5). Prior to the experiment all channels had been activated by flowing Piranha solution (1:3 $H_2O_2$:$H_2SO_4$) through the system, leaving the channel walls with a thin surface oxide layer. Avidin forms positive clusters that readily attach to the negatively charged oxide layer through electrostatic interactions.[53]

Phosphate buffered saline (1x PBS) was used as the reference and wash solution. After 5 minutes of acquiring a baseline, the solution in the detection channel was exchanged to water in order to verify that the system was correctly responding to bulk solution changes. After another 5 minutes, PBS was again flowed through all channels and the baseline signal was recovered. To confirm the ability of the device to sequentially measure changes in refractive index of multiple solutions, 2% glycerol was then introduced. As expected, the signal increased. Next, PBS was again introduced to all channels and the baseline signal was recovered.

Avidin adsorption was measured by flowing a solution of avidin in PBS through the detection channel for 5 minutes and subsequently rinsing with PBS for 10 minutes to remove any loosely bound protein. It is important to note that after the 10 minute rinse, the baseline signal was not recovered, suggesting the avidin molecules adhered tightly to the channel wall.

We expect that our nanofluidic grating sensor could be functionalized with different affinity reagents for the label-free detection of specific biomolecules. For sensitive detection, the large surface-to-volume ratio of these channels should provide distinct advantages, as molecules would have a high capture probability on their passage through the channel. At the same time, the large number of parallel nanochannels provides a large effective capture area, so that rare molecules could be efficiently concentrated in the sensing area.

Supplement on Theory

Figure 8A:
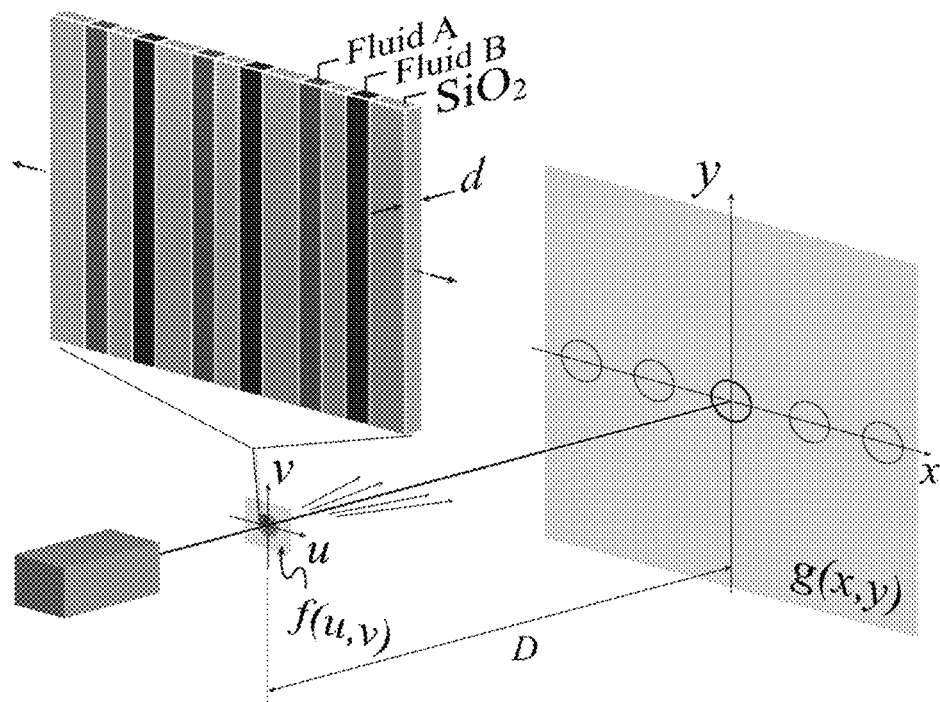
FIG. 8A and FIG. 8B show an intensity distribution of light propagating through a diffractive element which is formed by a linear microchannel array.

In this section, we calculate the intensity distribution of light propagating through a diffractive element which is formed by a linear microchannel array, as shown in FIG. 8A. For modeling purposes, we will assume that the microchannel array is thin and forms an ideal phase grating which is illuminated from the backside. The reflective grating used in our experiments is accommodated mathematically by setting the model path length d equal to two times the depth of the real channels.

In the following, our aim is to calculate the difference in refractive index between the fluids A and B by analyzing the intensity distribution of light at a distance D from the grating. For sufficiently large D, the Fraunhofer approximation can be used to relate the complex-valued entrance amplitude $f(u,v)$ to the exit amplitude $g(x,y)$ at distance D from the grating. When a Gaussian laser beam of power P and waist radius $\omega_0$ is used as the source, the entrance amplitude is given by $$f(u, v) = f_0 e^{-\frac{u^2+v^2}{\omega_0^2}} e^{i\varphi(u)} \quad (1)$$

$$\text{where } f_0 = \left(\frac{2P}{\pi\omega_0^2}\right)^{1/2}$$

and $\varphi(u)$ is a periodic function (period L) describing the phase shift induced by the grating. In the simple model depicted in FIG. 8A, $\varphi(u)$ is piecewise constant with values $\varphi_i = k\, d\, n_i$, where $n_i$ (i=1, 2, 3) is the refractive index of either fluid A (i=1), fluid B (i=2), or the wall material (here $SiO_2$, i=3); d is equal to the depth of the channels (equal for A and B) and $$k = \frac{2\pi}{\lambda}.$$

In the Fraunhofer approximation, the complex amplitude in the far field is given by $$g(x, y) = \frac{ie^{-ikD}}{\lambda D} \mathcal{F}\{f\}\left(k\frac{x}{D}, k\frac{y}{D}\right), \quad (2)$$

with the Fourier transform $$\mathcal{F}\{f\}(k_x, k_y) = \int\int_{-\infty}^{\infty} f(u, v) e^{-i(k_x u + k_y v)} du\, dv \quad (3)$$

$$= f_0 \pi \omega_0^2 \sum_{m=-\infty}^{\infty} a_m\, e^{-\frac{(k_x - \frac{2\pi m}{L})^2 + k_y^2}{4\omega_0^{-2}}}.$$

Figure 8B:
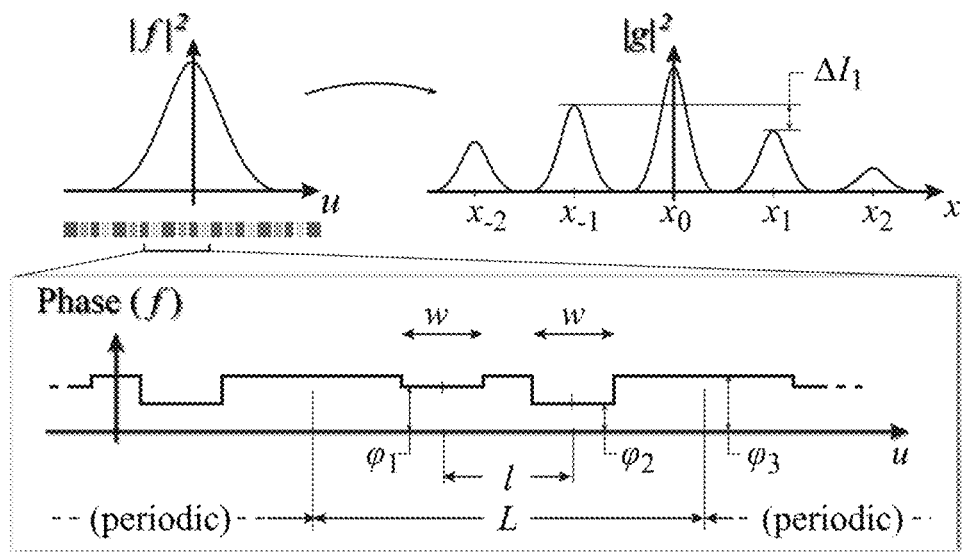
Figure 9A:
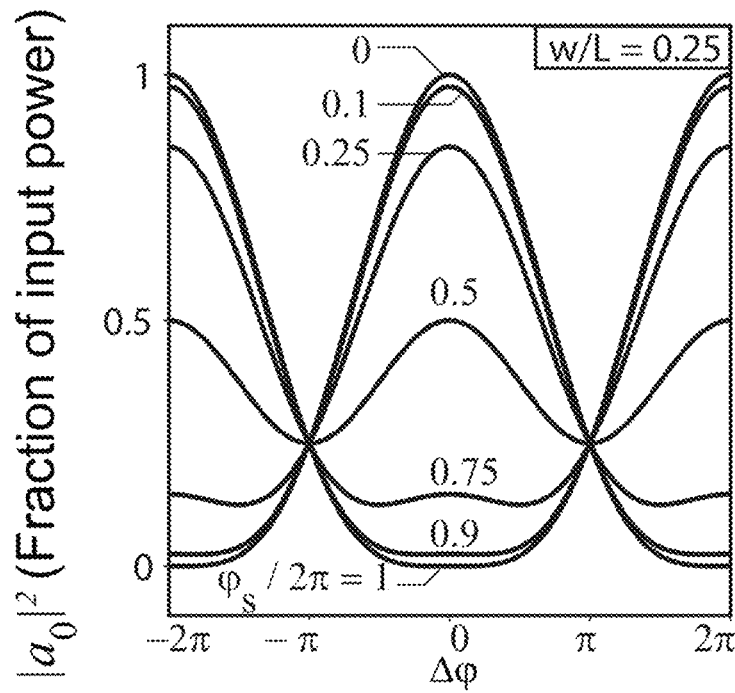
FIG. 9A to FIG. 9D show plots of various values relevant for the theoretical background of the present invention.
Figure 9B:
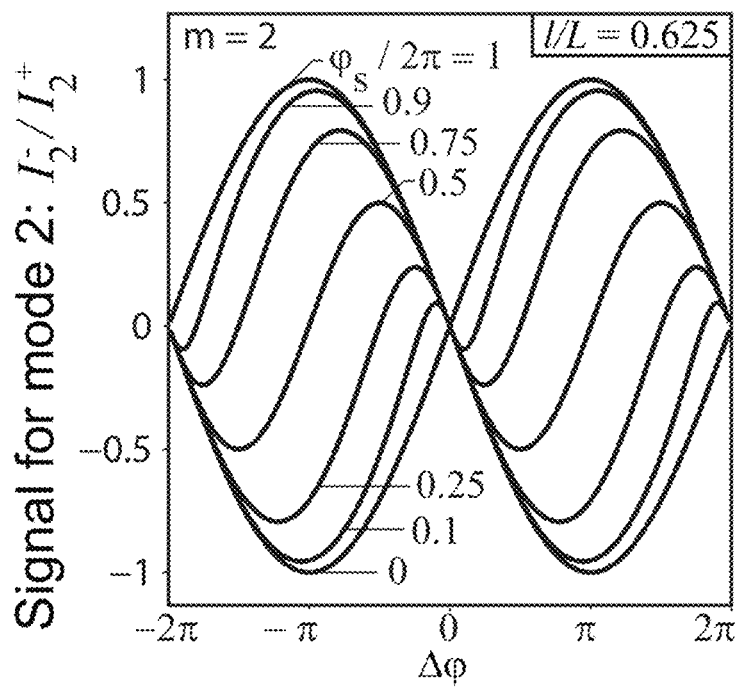
Figure 9C:
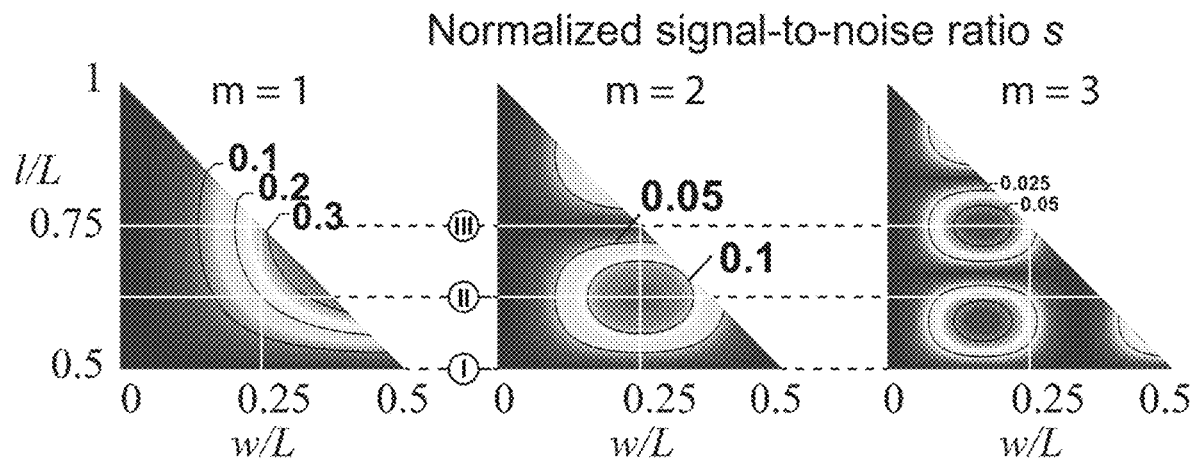
Figure 9D:
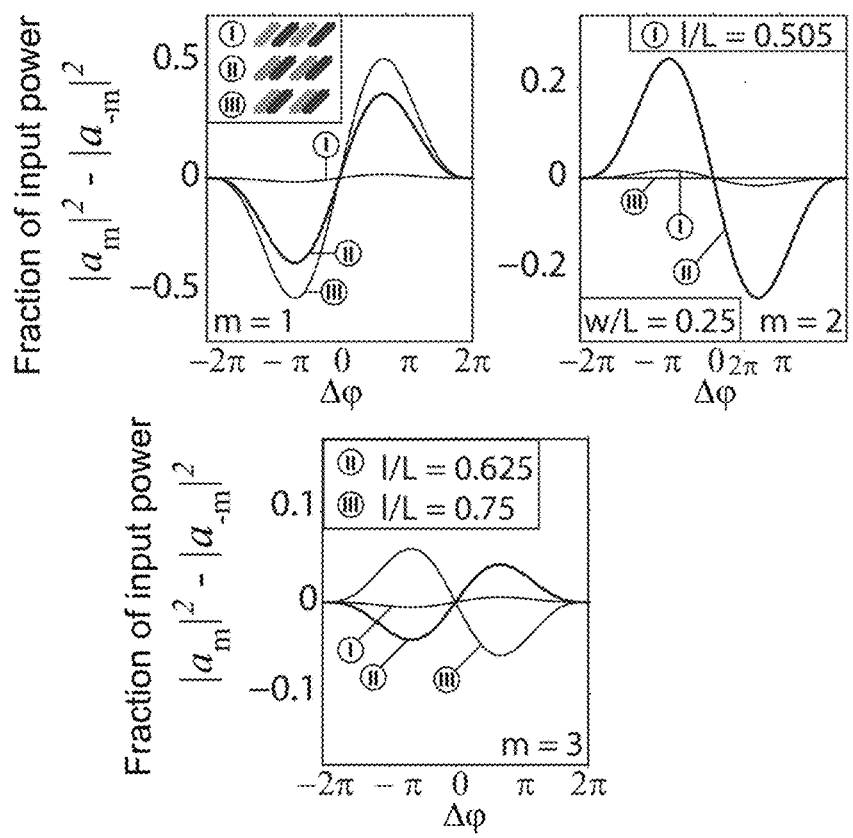

The coefficients are given by $$a_m = e^{i\varphi_3}\left[\delta_m + \frac{2w}{L} \cdot \mathrm{sinc}\left(\frac{w}{L}m\right)\left(e^{i\frac{\varphi_s}{2}} \cos\left(\frac{l}{L}\pi m + \frac{\Delta\varphi}{2}\right) - \cos\left(\frac{l}{L}\pi m\right)\right)\right], \quad (4)$$

where $\delta_m$ denotes the Kronecker Delta, $\Delta\varphi = \varphi_1 - \varphi_2$, and $\varphi_s = (\varphi_1 - \varphi_3) + (\varphi_2 - \varphi_3)$. When the diffraction orders are well separated, i.e. $\omega_0 \ll \frac{L}{2\pi}$, an intensity distribution similar to the one illustrated in FIG. 8B will be obtained. Neglecting the overlap between different orders, this can be approximated as $$|g(x, y)|^2 \approx \sum_{m=-\infty}^{\infty} I_m \cdot e^{-\frac{(k\frac{x-x_m}{D})^2 + (k\frac{y}{D})^2}{2\omega_0^2}}, \quad (5)$$

which represents peaks at positions $$x_m = \frac{m\lambda}{L}D$$

with peak intensities $$I_m = g_0^2 |a_m|^2 \text{ and } g_0 = \frac{1}{\lambda D}\sqrt{2P\pi\omega_0^2}.$$

Note that the numerical value of $|a_m|^2$ directly equals the fractional laser power deflected into mode number m.

As primary signal $S_m$ we consider the ratio between the difference $I_m^- := I_m - I_{-m}$ and the sum $I_m^+ := I_m + I_{-m}$ for mode pairs $\pm m \neq 0$:

$$S_m := \frac{I_m^-}{I_m^+} = \frac{\sin\left(\frac{l}{L}2\pi m\right)\sin\frac{\Delta\varphi}{2}}{\left[\cos\frac{\varphi_s}{2} - \cos\frac{\Delta\varphi}{2}\right]^{-1} \cdot} \quad (6)$$

$$\sin^2\frac{\Delta\varphi}{2} - 2\cos^2\left(\frac{l}{L}\pi m\right)\cos\frac{\Delta\varphi}{2}$$

$$\approx -\frac{\Delta\varphi}{2}\tan\left(\frac{l}{L}\pi m\right)\left[1 + \frac{\Delta\varphi^2}{12}\left(\frac{3}{4\sin^2\frac{\varphi_s}{4}} - 1\right)\right] + O(\Delta\varphi^5)$$

Note that Equation 6 is only meaningful when $$\cos\left(\frac{l}{L}\pi m\right) \neq 0,$$

as otherwise no light is diffracted into the modes of order m, i.e. $I_m^+|_{\Delta\varphi=0} = 0$. In addition, Equation 6 is zero when $l/L = \frac{1}{2}$ because then the diffraction pattern is perfectly symmetric. With this in mind, l can be chosen more or less freely within the range $w < l < L - w$, with only a few values prohibited by manufacturing constraints.

In order to select suitable values for l and w, we analyze how these parameters affect the resolution with which small differences in refractive index between the channel sets A and B can be detected.

We define the signal based on the inverse power series expansion of Equation 6 as $$\widehat{\Delta n} := -\frac{2}{kd}\cot\left(\frac{l}{L}\pi m\right)\frac{\hat{I}_m^-}{\hat{I}_m^+}, \quad (7)$$

where hat symbols are used to designate measured values. Associated with the intensity measurements is an error $\sigma_m = \text{Std}\{\hat{I}_m\}$, which comprises all noise sources, including shot noise, laser power fluctuations, detector noise, speckle, stray light, and uncompensated offset drift. For $I_m^- \ll I_m^+$, we can approximate $$\sigma_{\hat{I}_m^-/\hat{I}_m^+} \approx \frac{\sqrt{2}\,\sigma_m}{I_m^+}.$$

By inserting this on the left hand side of Equation 6 and solving to first order in $\Delta n$ we obtain the noise equivalent refractive index difference $$\sigma_{\widehat{\Delta n}} = \frac{\sqrt{2}}{8}\frac{\sigma_m}{g_0^2}\frac{1}{kd}\frac{(\pi m)^2}{\sin^2\left(\frac{w}{L}\pi m\right)\left|\sin\left(\frac{l}{L}2\pi m\right)\right|\sin^2\frac{\varphi_s}{4}}. \quad (8)$$

The signal-to-noise ratio is maximized by choosing the channel width w and channel separation l such that $$m\frac{w}{L} \text{ and } 2m\frac{l}{L}$$

each is an odd multiple of ½. Here the range is obviously limited to $$w \leq \frac{L}{2}$$

and $w \leq l \leq L - w$ to ensure that both channels fit within one grating period without overlapping each other. Regarding the channel depth, signal-to-noise maxima are attained when $$d = (2j+1)\frac{\lambda}{|\bar{n} - n_3|},$$

for any integer $j \geq 0$. This will ensure that $\varphi_s$ is an odd multiple of $2\pi$.

What is attractive about the first order approximation given by Equation 7 is that only an intensity ratio is required. This makes it possible to measure the refractive index difference between fluids A and B robustly without knowing any of the absolute refractive index values in the system. Unfortunately, however, only the linear term can be used in this manner. If we were to continue the inverse expansion of Equation 6, the sum of optical path lengths, $\varphi_s$, would also play a role. While it is possible in theory to measure this value using the absolute intensities, doing so with precision significantly increases the complexity of the method.

How limiting is our restriction to the first order inverse in Equation 7? There are two types of inaccuracies to consider. The first, and perhaps most obvious one is due to deviations from linearity when $\Delta n$ becomes large. FIG. 9A to FIG. 9D show the resulting error $$e := E\{\widehat{\Delta n}\} - \Delta n. \quad (10)$$

This error depends strongly on the average refractive index $$\bar{n} = \frac{n_1 + n_2}{2}.$$

Any device design is optimized for only one value of n according to the condition for $\varphi_s$ given above. The second important type of systematic error is the caused by an imperfect suppression of common mode variations, i.e. refractive index modulations that are identical in channels A and B. A useful measure of this type of error is the slope d $\widehat{\Delta n}/d\bar{n}$, which would be exactly zero in an ideal difference measurement. Although such perfect common-mode suppression is achieved only at the design value $\bar{n}=\bar{n}_0$, several orders of magnitude are still possible over a wide dynamic range, as shown in FIG. 9A to FIG. 9D.

Finally, we discuss the dynamic range of n over which meaningful measurements can be conducted. For this purpose, we assume that $\Delta n \ll \bar{n}$, which is the regime where our differential method provides the greatest advantage over conventional single-ended measurements. The widest dynamic range is achieved for d chosen as the lowest order, i.e. j=0. In this case the range between adjacent minima in sensitivity is defined by the condition $$0 \le \left|\frac{n_3 - \bar{n}}{n_3 - \bar{n}_0}\right| \le 2.$$

For example, a device designed for water ($\bar{n}_0=1.33$) with thermal silicon dioxide as material between the channels A and B ($n_3=1.46$) would be usable over the range $1.2<\bar{n}<1.46$.

CONCLUSIONS

Here we report the development of a new nanofluidic device for simple and robust differential refractive index measurements in an ultra-low volume. Optical differencing is performed directly by an interferometer with a common path for the sensing and the reference arm. This is enabled by guiding the sample and reference fluids through two sets of parallel nanochannels arranged to form an interdigitated optical reflection grating. A key innovation in our design is the asymmetric arrangement of the unit cell of the grating, which shifts the operating point of the interferometer to allow sensitive measurements even when the refractive index of the two solutions is nearly matched.

The differential design of our system allows measurements that are inherently compensated for common mode variations. Here, we have shown that common mode refractive index changes due to temperature fluctuations can be suppressed by at least a factor of 10 in the differential signal. The noise floor of the device in our current setup is limited by low-frequency fluctuations to $1.3 \times 10^{-5}$ RIU (standard deviation over 4 minutes). We expect that this can still be significantly improved by optimization of channel alignment and external measurement components.

The separate fluidic addressing of reference and detection channels allows a specific immobilization of molecules in just the detection channels. The capability of quantifying thin adsorbed protein layers in combination with the above described common mode rejection provides the potential for detecting biomolecules label-free with a uniquely simple, robust, and inherently differential sensor. Future applications as a point-of-care device are therefore very attractive.

Many variations and modifications may be made to the preferred embodiments of the invention without departing substantially from the spirit and principles of the invention. All such modifications and variations are intended to be included herein within the scope of the present invention, as defined by the following claims.

REFERENCES

1 S. G. Patching, Biochimica et Biophysica Acta (BBA)—Biomembranes, 2014, 1838, 43-55.
2 Q. G. Shi, L. N. Ying, L. Wang, B. J. Peng and C. F. Ying, Applied Mechanics and Materials, 2014, 551, 347-352.
3 K. S. Rangappa, Proceedings of the Indian Academy of Science—336 Section B, 1948, 131-143.
4 T. M. Libish, J. Linesh, M. C. Bobby, P. Biswas, S. Bandyopadhyay, K. Dasgupta and P. Radhakrishnan, Optoelectronics and Advanced Materials, Rapid Communications, 2011, 5, 68-72.
5 S. Agarwal, Y. Prajapati and V. Mishra, Opto-Electronics Review, 2015, 23, 271-277.
6 J. Homola, Chemical Reviews, 2008, 108, 462-493.
7 F. B. Myers and L. P. Lee, Lab on a Chip, 2008, 8, 2015.
8 M. Svedendahl, R. Verre and M. Käll, Light: Science & Applications, 2014, 3, e220.
9 F. De-Jun, L. Guan-Xiu, L. Xi-Lu, J. Ming-Shun and S. Qing-Mei, Applied Optics, 2014, 53, 2007.
10 S. Filion-Côté, M. Tabrizian and A. G. Kirk, Sensors and Actuators B: Chemical, 2017, 245, 747-752.
11 G. G. Yaralioglu, A. Atalar, S. R. Manalis and C. F. Quate, Journal of Applied Physics, 1998, 83, 7405-7415.
12 C. A. Savran, T. P. Burg, J. Fritz and S. R. Manalis, Applied Physics Letters, 2003, 83, 1659-1661.
13 K. Hosokawa, K. Hanada and R. Maeda, Journal of Micromechanics and Microengineering, 2002, 12, 1-6.
14 T. Thundat, E. Finot, Z. Hu, R. H. Ritchie, G. Wu and A. Majumdar, Applied Physics Letters, 2000, 77, 4061-4063.
15 G. Ye and X. Wang, Biosensors and Bioelectronics, 2010, 26, 772-777.
16 C. L. Chang, Z. Ding, V. N. L. R. Patchigolla, B. Ziaie and C. A. Savran, IEEE Sensors Journal, 2012, 12, 2374-2379.
17 Y. G. Tsay, C. I. Lin, J. Lee, E. K. Gustafson, R. Appelqvist, P. Magginetti, R. Norton, N. Teng and D. Charlton, Clinical Chemistry, 1991, 37, 1502-1505.
18 C.-L. Chang, G. Acharya and C. A. Savran, Applied Physics Letters, 2007, 90, 233901.
19 C. Lv, Z. Jia, Y. Liu, J. Mo, P. Li and X. Lv, Journal of Applied Physics, 2016, 119, 094502.
20 P. M. St. John, R. Davis, N. Cady, J. Czajka, C. A. Batt and H. G. Craighead, Analytical Chemistry, 1998, 70, 1108-1111.
21 M. M. Varma, D. D. Nolte, H. D. Inerowicz and F. E. Regnier, Opt. Lett., 2004, 29, 950-952.
22 J. B. Goh, R. W. Loo and M. C. Goh, Sensors and Actuators B: Chemical, 2005, 106, 243-248.
23 B V Metrohm Autolab, Autolab ESPRIT Data Acquisition 4.4 User manual SPR, 2009.
24 Handbook of Spectroscopy, ed. G. Ganglitz and D. S. Moore, Wiley-VCH Verlag GmbH, 2014, p. 1993.
25 A. Ymeti, J. S. Kanger, R. Wijn, P. V. Lambeck and J. Greve, Sensors and Actuators B: Chemical, 2002, 83, 1-7.
26 K. Chaitavon, S. Sumriddetchkajom and J. Nukeaw, RSC Advances, 2013, 3, 6981.

27 K. Chaitavon, S. Sumriddetchkajom and J. Nukeaw, RSC Advances, 2013, 3, 23470.
28 A. Ymeti, J. Kanger, J. Greve, P. Lambeck, R. Wijn and R. Heideman, TRANSDUCERS '03. 12th International Conference on Solid-State Sensors, Actuators and Microsystems. Digest of Technical Papers (Cat. No. 03TH8664), 2003, pp. 1192-1196.
29 Z. Wang and D. J. Bornhop, Analytical Chemistry, 2005, 77, 7872-7877.
30 V. Zamora, P. Lützow, M. Weiland and D. Pergande, Sensors, 2013, 13, 14601-14610.
31 H. Li and X. Fan, Applied Physics Letters, 2010, 97, 011105.
32 C. F. Carlborg, K. B. Gylfason, A. Ka'zmierczak, F. Dortu, M. J. Bañuls Polo, A. Maquieira Catala, G. M. Kresbach, H. Sohlström, T. Moh, L. Vivien, J. Popplewell, G. Ronan, C. A. Barrios, G. Stemme and W. van der Wijngaart, Lab Chip, 2010, 10, 281-290.
33 M. Li, X. Wu, L. Liu, X. Fan and L. Xu, Analytical Chemistry, 2013, 85, 9328-9332.
34 A. P. Zhang, G. Yan, S. Gao, S. He, B. Kim, J. Im and Y. Chung, Applied Physics Letters, 2011, 98, 221109.
35 W. Liang, Y. Huang, Y. Xu, R. K. Lee and A. Yariv, Applied Physics Letters, 2005, 86, 151122.
36 R. St-Gelais, J. Masson and Y.-A. Peter, Applied Physics Letters, 2009, 94, 243905.
37 T. Wei, Y. Han, Y. Li, H.-I. Tsai and H. Xiao, Optics Express, 2008, 16, 5764.
38 H. Wu, H. Huang, M. Bai, P. Liu, M. Chao, J. Hu, J. Hao and T. Cao, Optics Express, 2014, 22, 31977.
39 J. Tian, Y. Lu, Q. Zhang and M. Han, Optics Express, 2013, 21, 6633.
40 P. Domachuk, I. C. M. Littler, M. Cronin-Golomb and B. J. Eggleton, Applied Physics Letters, 2006, 88, 093513.
41 S. Surdo, S. Merlo, F. Carpignano, L. M. Strambini, C. Trono, A. Giannetti, F. Baldini and G. Barillaro, Lab on a Chip, 2012, 12, 4403.
42 S. Surdo, F. Carpignano, L. M. Strambini, S. Merlo and G. Barillaro, RSC Advances, 2014, 4, 51935-51941.
43 S. Mandal and D. Erickson, Optics Express, 2008, 16, 1623.
44 Z. Xu, X. Wang, K. Han, S. Li and G. L. Liu, Journal of the Optical Society of America A, 2013, 30, 2466.
45 Z. Xu, K. Han, I. Khan, X. Wang and G. L. Liu, Optics Letters, 2014, 39, 6082.
46 N. Kumawat, P. Pal and M. Varma, Scientific Reports, 2015, 5, 16687.
47 A. Marin, M. Joanicot and P. Tabeling, Sensors and Actuators B: Chemical, 2010, 148, 330-336.
48 S. Y. Yoon and S. Yang, Lab on a Chip, 2011, 11, 851.
49 K. Q. Kieu and M. Mansuripur, IEEE Photonics Technology Letters, 2006, 18, 2239-2241.
50 F. Pedrotti, L. Pedrotti, W. Bausch and H. Schmidt, Optik für Ingenieure, Springer Verlag, Berlin, 3rd edn, 2005.
51 K. Takamura, H. Fischer and N. R. Morrow, Journal of Petroleum Science and Engineering, 2012, 98-99, 50-60.
52 A. N. Bashkatov and E. A. Genina, Proc. SPIE 5068, Saratov Fall Meeting 2002: Optical Technologies in Biophysics and Medicine IV, 393 (Oct. 14, 2003), 2003, pp. 393-395.
53 A. Ebner, Handbook of Single-Molecule Biophysics, Springer Verlag, 2009, p. 410.

We claim:

1. A method of comparing first optical properties of a first fluid with second optical properties of a second fluid,
    wherein a first transparent grating having a grating constant is made of the first fluid,
    wherein a second transparent grating also having said grating constant is made of the second fluid,
    wherein the second transparent grating is arranged at a lateral offset of less than 45% of said grating constant with regard to the first transparent grating such that each pair of grating bars of the first and second transparent gratings are arranged side by side form an asymmetric unit cell of an overall arrangement of the first and second transparent gratings,
    wherein coherent light is directed onto the first and second transparent gratings such that light which passed through the grating bars of the overall arrangement of the first and second transparent gratings forms a diffraction pattern comprising intensity maxima,
    wherein two light intensities of two intensity maxima of the diffraction pattern which are of a same order higher than zero are measured and compared to each other.

2. The method of claim 1, wherein the two light intensities of two intensity maxima of the first or second order are measured and compared to each other.

3. The method of claim 1, wherein a refractive index difference between a first refractive index of the first fluid and a second refractive index of the second fluid is calculated from the two light intensities of the two intensity maxima of the same order.

4. The method of claim 3, wherein the refractive index difference is calculated from a difference of the two light intensities of the two intensity maxima of the same order divided by a sum of the two light intensities of two intensity maxima of the same order and by a constant.

5. The method of claim 1, wherein at least one of the first and the second fluids contain biological cells.

6. The method of claim 5, wherein a temporal development of the two fluids is monitored by repeatedly directing the coherent light onto the first and second transparent gratings and measuring the two light intensities of the two intensity maxima of the same order.

7. The method of claim 1, wherein the first and the second transparent gratings are made by filling first and second sets of parallel fluidic channels in a microfluidic chip with the first and second fluid, respectively.

8. The method of claim 7, wherein the microfluidic chip is reflective for the coherent light.

9. The method of claim 7, wherein the microfluidic chip is transparent for the coherent light.

10. The method of claim 7, wherein the coherent light is directed through a slit or a hole in a tilted mirror onto the microfluidic chip, wherein the mirror deflects the diffraction pattern towards a camera of a light detector.

11. An apparatus for comparing first optical properties of a first fluid with second optical properties of a second fluid, the apparatus comprising
    a microfluidic chip in which first and second sets of parallel fluidic channels are provided under a transparent cover plate,
        wherein the fluidic channels of the first set are arranged at a fixed spacing and connected to a first fluid supply channel at one of their ends and to a fluid removal channel at the other one of their ends,
        wherein the fluidic channels of the second set are arranged at said fixed spacing and connected to a second fluid supply channel at one of their ends and to a fluid removal channel at the other one of their ends,
        wherein the fluidic channels of the second set are arranged at a lateral offset of less than 45% of said fixed spacing with regard to the fluidic channels of the first set such that each pair of the fluidic channels of the first and second sets are arranged side by side form an asymmetric unit cell of an overall arrangement of the first and second sets.

12. The apparatus of claim 11 further comprising
a light source directing coherent light onto the microfluidic chip such that light which passed through the fluidic channels of the first and second sets forms a diffraction pattern comprising intensity maxima, and
a light detector configured to measure two light intensities of two intensity maxima of a same order higher than zero.

13. The apparatus of claim 11 further comprising a pressure controller configured to control pressures in the fluid supply and removal channels.

14. The apparatus of claim 11, wherein the fluidic channels of the first and second sets have a same width and a same depth measured in and perpendicular to a plane defined by the parallel fluidic channels, respectively.

15. The apparatus of claim 14, wherein
the same width of the fluidic channels of the first and second sets is in a range from 100 nm to 20 µm,
the same depth of the fluidic channels of the first and second sets is in a range from 10 nm to 10 µm, and
the fixed spacing of the fluidic channels of the first and second sets is in a range from 500 nm to 100 µm.

16. The apparatus of claim 11, wherein the fluidic channels of the first and second sets are connected to a same fluid removal channel at the other one of their ends.

17. The apparatus of claim 11, wherein the microfluidic chip is reflective for the coherent light.

18. The apparatus of claim 11, wherein the microfluidic chip is transparent for the coherent light.

19. The apparatus of claim 11, wherein the light source directs the coherent light through a slit or a hole in a tilted mirror onto the microfluidic chip, wherein the mirror deflects the diffraction pattern towards a camera of the light detector.

20. A method of use of the apparatus of claim 11, wherein a temporal development of material deposited on or removed from the inner surfaces of one or both sets of fluidic channels is monitored by repeatedly directing the coherent light onto the first and second transparent gratings that are formed by the fluidic channels and measuring the two light intensities of the two intensity maxima of the same order.

* * * * *